United States Patent [19]

Schwankhart

[11] 4,190,239
[45] Feb. 26, 1980

[54] SHOCK ABSORBER ASSEMBLY AND INSTALLATION

[75] Inventor: Gerhard Schwankhart, Attnang-Puchheim, Austria

[73] Assignee: Walter Sticht, Attnang-Puchheim, Austria

[21] Appl. No.: 914,617

[22] Filed: Jun. 8, 1978

[30] Foreign Application Priority Data

Jun. 17, 1977 [AT] Austria ................... 4283/77

[51] Int. Cl.² ............................................. F16F 9/19
[52] U.S. Cl. ................................. 267/65 R; 188/282
[58] Field of Search ............... 188/282, 285, 299, 311, 188/312, 320; 267/65 D, 65 R, 136

[56] References Cited

U.S. PATENT DOCUMENTS

| | | | |
|---|---|---|---|
| 1,718,700 | 6/1929 | Luoma | 267/65 R |
| 2,018,312 | 10/1935 | Moulton | 188/318 |
| 3,147,967 | 9/1964 | Bougeard | 267/65 R |
| 3,694,111 | 9/1972 | Braun | 267/65 R X |
| 3,799,299 | 3/1974 | Cohen | 188/282 |

*Primary Examiner*—Duane A. Reger
*Attorney, Agent, or Firm*—Kurt Kelman

[57] ABSTRACT

A pneumatic shock absorber comprises a cylinder and a piston defining a pressure chamber in the cylinder. The shock absorber has an inlet passage and an outlet passage which communicate with the pressure chamber. The inlet passage is permanently connected to an external compressed air source. A check valve is incorporated in the inlet passage. An adjustable relief valve is incorporated in the outlet passage.

7 Claims, 1 Drawing Figure

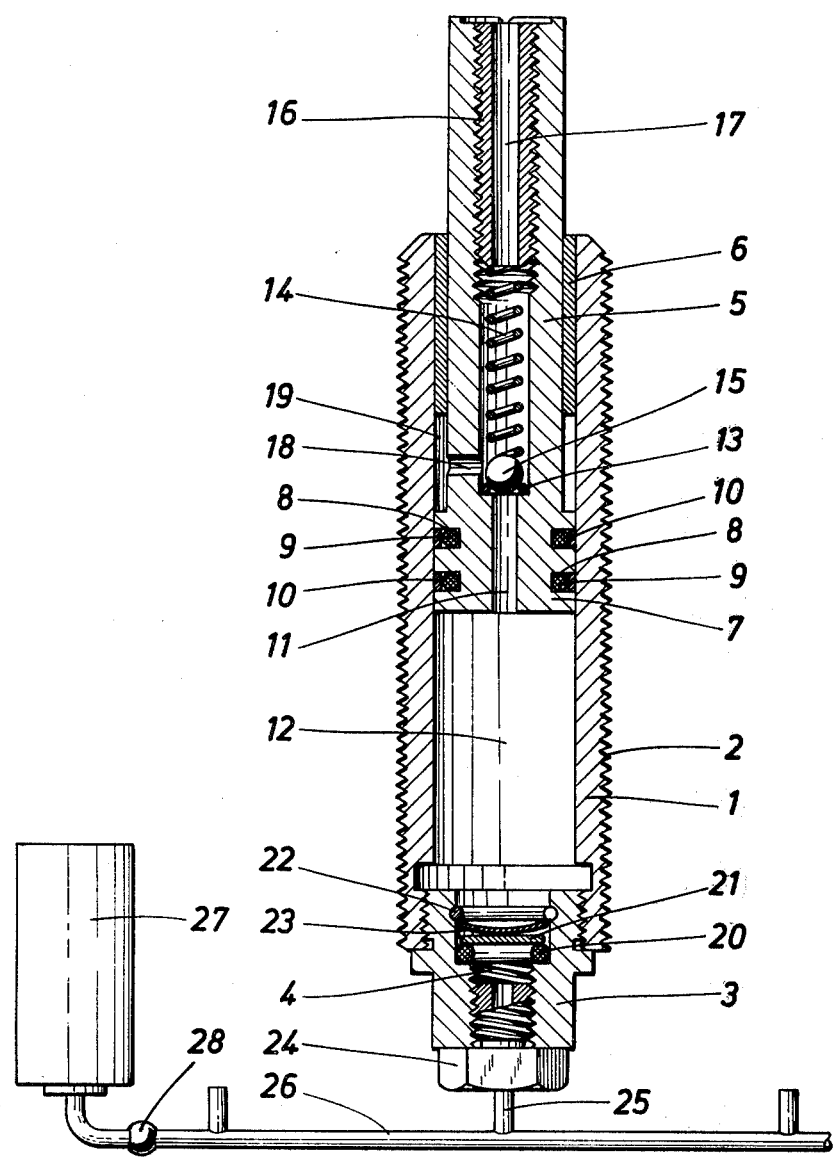

SHOCK ABSORBER ASSEMBLY AND INSTALLATION

This invention relates to a shock absorber assembly, which is particularly intended for use in assembling machines and for damping shocks which occur at high frequency, comprising a pneumatic piston-cylinder unit defining in the cylinder a pressure chamber, and an inlet check valve for filling the pressure chamber with compressed air.

Pneumatic shock absorbers are known in the form of so-called air or gas springs, in which the inlet check valve serves only to fill the pressure chamber in the cylinder initially with a gas which is under a predetermined superatmospheric pressure. The check valve should provide for an absolutely tight seal after that filling operation. Such air springs have predetermined spring characteristics and oscillation characteristics which depend on the design of the spring and the pressure in the pressure chamber and cannot be substantially changed in practice. Air springs having a strictly progressive characteristic are known as well as air springs having a characteristic which depends on the position of the piston and is changed when the piston has moved into the cylinder beyond a certain position. In an air spring of the latter type, the piston is provided with a constricted passage closed by a tappet valve, which is actuated from the outside by means of stops when the piston has been pushed into the cylinder to a predetermined extent. Directional valves may be provided, which open a larger passage, e.g., during the return of the piston. Just as in corresponding hydraulic shock absorbers, such arrangements can be used in most cases only in conjunction with an additional spring for returning the piston.

Air springs comprising piston-cylinder units often exhibit leakage so that the loss of air results in a decrease of the spring force. Besides, the seals and packings are subjected to very high pressure and the relatively movable parts often become seized in the end positions of the spring and subsequently begin to move with a jerk so that the overall characteristic is adversely affected. For this reason the conventional piston-cylinder units are often replaced by combinations comprising a pressure vessel and compressible bellows.

It has been stated hereinbefore that hydraulic piston-cylinder units are mainly used as shock absorbers in vehicles. In these shock absorbers, the piston is formed with a constricted passage which connects the two pressure chambers in the cylinder and determines the damping action. In these shock absorbers, the piston may also be provided with a valve which opens or closes in dependence on the direction of movement so that different damping characteristics are obtained in the two directions of movement. Hydraulic shock absorbers are used virtually only in combination with one or more springs for cushioning the shocks. As a result, the damping characteristic for the entire movement depends on the properties of the springs and the properties of the hydraulic shock absorber. In hydropneumatic spring assemblies it is known to connect hydraulic shock absorbers by means of conduits to a common vessel, which is equivalent to a receiver. In such an arrangement the overall characteristic of the spring or shock absorber assembly can be influenced by a control of the pressure in the receiver. On the other hand it is not possible and would not make sense to change the characteristic of a single shock absorber. In all other hydraulic shock absorbers the damping characteristics cannot be changed at all or can be changed only to a small extent. In cases in which it is required to damp vibrations or shocks which vary greatly in frequency and in maximum or average force, it has previously been necessary to provide different shock absorbers and springs having properly selected characteristics. In the design of motor vehicles it is difficult to select a damping characteristic which provides for an adequate damping under different loaded conditions of the vehicle. In numerous other cases, separate shock absorbers consisting in most cases of a spring and vibration damper combination or of a rubber spring or air spring must be used for each application. By way of example, reference is made to assembling machines which have a given basic structure and are required to move parts having different weights at different velocities and to arrest the movements of such parts. In vibratory conveyors, the frequencies at which the parts are moved or, more generally speaking, the frequency of the shocks to be damped, may vary greatly. To provide for an optimum damping, exactly matched shock absorber units must be used so that a very large number of such units must be kept in stock. As assembling machines are made individually or in small series, it is hardly possible to rely on empirical values in matching or tuning the shock absorbers so that the tuning or the selection of the proper shock absorber combination is time-consuming. Besides, known shock absorbers as well as known shock absorber combinations consisting of a vibration damper and spring have different overall dimensions depending on their characteristics so that it is not always possible to selectively install different shock absorber units in a given structure. Similar problems are encountered in numerous other fields of application.

It is also known that so-called hydraulic linkages, such as are used, inter alia, in machines for driving corks into bottles, comprise piston-cylinder units in which the piston contains a relief valve, which opens when a predetermined pressure is exceeded so that force can be transmitted by the linkage only up to an upper limit. Such linkages must be provided with separate means which collect the oil escaping through the relief valve and return said oil to the pressure chamber as the linkage is relieved.

It is an object of the invention to provide a shock absorber assembly which is of the kind described first hereinbefore and is simple in structure and can be adapted by very simple means to greatly varying conditions of operation.

This object is accomplished with an inlet check valve adapted to be connected in operation to an external compressed air source which is permanently connected to the shock absorber when the latter is installed, and a pressure chamber having an outlet provided with an adjustable relief valve.

In numerous plants and adjacent to numerous machines, such as assembling machines, an external compressed air source is available for other purposes. That external compressed air source is used to generate the inlet pressure which tends to hold the piston of the shock absorber in a position of rest or to return the piston to that position of rest. The relief valve can be adjusted to open at a pressure which is independent of and in most cases higher than the inlet pressure. When the relief valve is open, the piston moves toward its fully actuated position against a backpressure which remains virtually constant and which can be selected because the relief valve is adjustable. During the cushioning of a load, the shock absorber assembly functions like an air spring having a linear characteristic and can be infinitely matched to the load to be cushioned. The piston is returned by the action of the fluid which is supplied from the external compressed air source, and the forces selected to return the piston differ in magnitude from the forces serving to cushion the load. Because a constant pressure is applied, the returning forces are also constant. In case of a proper adjustment, a sudden return of the piston to its extended position, resulting in a chattering of a cushioned body, can be substantially avoided. The returning force may be adjusted if the check valve is adjustable or if a control valve, e.g., an adjustable throttling valve, is incorporated in a conduit which leads from the check valve to the external compressed air source. Alternatively, the conduit leading to the pressure chamber of the cylinder may be connected to a reservoir, which is connected by a throttling valve or check valve to an external compressed air and which has the same volume, by order of magnitude, as the pressure chamber, or has a correspondingly larger volume when connected to a plurality of shock absorbers. In that arrangement the pressure which is available at the inlet of the pressure chamber is higher when the check valve is just opened than at the end of the return movement of the piston so that the returning force is progressively decreased. This is desirable when a body being cushioned is to be gently restored to a position which corresponds to the position of rest of the shock absorber. It is apparent that the characteristics of the shock absorber assembly according to the invention can be varied for an exact adaptation to the specific application. Even shocks or vibrations at a relatively high frequency can be adequately damped. The adjustable relief valve is arranged in most cases in the piston and may be connected to the ambient atmosphere by a bore through the piston rod.

The shock absorber assembly according to the invention has a long life because the constant supply of air from the compressed air source eliminates the need for a dissipation of heat to avoid changes of the spring characteristics, as is required in other air springs, and even leaks are not significant because they can be compensated by a suitable readjustment of the valves.

An embodiment of a shock absorber assembly according to the invention is illustrated by way of example on the accompanying drawings, in which a shock absorber is shown in section and a compressed air source and a supply conduit are diagrammatically indicated.

The shock absorber consists of a piston-cylinder unit. The cylinder consists of a tube 1 which has external screw threads 2 and a valve nipple 3 which closes the tube at one end. The valve nipple 3 has a tapped bore 4 for connection to a compressed air conduit. A low-friction bushing 6 is inserted in the other end of the cylinder and serves to guide a piston rod 5 which carries a piston 7. The piston is formed with annular grooves 8, which contain O-rings 9 and rings 10 which surround the O-rings and consist of a low-friction material, such as polytetrafluoroethylene. The O-rings 9 urge the rings 10 against the cylinder wall.

The piston 7 has a longitudinal bore 11, which connects the pressure chamber 12 of the piston-cylinder unit to a relief valve. The latter consists in the embodiment shown by way of example of an O-ring 13 serving as a valve seat and of a ball 15 which is biased by a spring 14. The valve is adjustable by means of a bushing 16 which is screw-threaded in the piston rod 6 and forms an abutment for spring 14. The bushing has a bore 17. A transverse bore 18 in the piston rod 5 vents a chamber 19 which is enclosed between the rear end of the piston 7 and the guide bushing 6.

A check valve is provided between the tapped bore 4 and the pressure chamber 12. In the embodiment shown by way of example that check valve consists of an O-ring 20 serving as a valve seat and of a valve disc 21 which is biased by a leaf spring 23. The latter bears on an expanding ring 22.

A nipple 24 is screw-threaded in the tapped bore 4 and serves for a connection to a conduit 25, which branches off conduit 26. The latter is connected by a control valve 28 to an external compressed air source 27 which is diagrammatically shown as a container. By means of the external screw threads 2, the shock absorber can be installed in a tapped bore in different elevations. As air pressure adjusted by the control valve 28 is applied to the check valve 20 to 23, the latter is open when the piston 7 is under no load. In that case the same pressure is present in the pressure chamber 12 and in the supply conduit 25, 26. When the piston rod 5 is subjected to a force which tends to push the piston 7 into the cylinder and exceeds the force which tends to push the piston outwardly—the latter force is determined by the pressure in the conduit and the piston area—the pressure in the pressure chamber 12 will increase and the check valve 20 to 23 will close. When a further movement of the piston 7 decreases the volume of the pressure chamber 12, the pressure therein eventually rises above the pressure which is applied by the spring 14 of the relief valve to the ball 15 and has been adjusted by the threaded bushing 16. As a result, the ball 15 is unseated and the further movement of the piston 7 in the sense of a decrease of the chamber volume is opposed by a virtually constant force. Air can now escape from the chamber 12 through the bore 11, the valve seat 13 and the bore 17. When the load on the piston rod decreases below the opposing force, the relief valve 13 to 15 closes and the check valve 20 to 23 can open again. Pressure is now applied to the piston 7 by the compressed air source 27 and can return the piston because the force acting on the piston from the outside has decreased. Before or after the piston has been fully moved outwardly, it can be pushed into the cylinder by another application of a stronger force tending to push in the piston.

When the check valve 20 to 23 is closed, the shock absorber of the shock absorber assembly has a progressive characteristic as long as the relief valve 13, 14, 15 is closed and a linear characteristic when the relief valve has been opened. An impact load can be cushioned in accordance with a progressive damping characteristic in the first half of the damping stroke and subsequently with a linear damping characteristic. This can be accomplished with a suitable setting of the valve means. It is possible to select such adjustments that a load is cushioned very softly with very little noise.

When it is inherently established that the piston cannot be pushed into the cylinder beyond a predetermined limit, i.e., that the volume of the pressure chamber 12 cannot decrease below a certain lower limit, the compressed air connection 4, 25 and/or the outlet with the relief valve may be provided in the tube 1 which constitutes the cylinder wall.

What is claimed is:

1. A pneumatic shock absorber comprising
   (a) a source of compressed air,
   (b) a cylinder having two ends,
   (c) a piston mounted reciprocably in the cylinder for assuming different axial positions therein, the piston defining
      (1) a pressure chamber in the cylinder adjacent one of the cylinder ends,
   (d) inlet passage means communicating with the pressure chamber,
   (e) conduit means premanently connecting the compressed air source to the inlet passage means for delivering compressed air to the pressure chamber for reciprocation of the piston,
   (f) a check valve in the inlet passage means and responsive to an air pressure in the pressure chamber exceeding the pressure of the compressed air for preventing the escape of compressed air from the pressure chamber,
   (g) an outlet passage means connected to the atmosphere and communicating with the pressure chamber in any of the axial positions of the piston, and
   (h) an adjustable relief valve in the outlet passage and responsive to a pressure in the pressure chamber to which the relief valve is adjusted for venting the said pressure to the atmosphere.

2. The pneumatic shock absorber of claim 1, further comprising a piston rod reciprocable with the piston and extending through the other end of the cylinder, the outlet passage means including an axial bore through the piston and piston rod having ends in respective communication with the pressure chamber and the atmosphere, and the relief valve being mounted on said axial bore.

3. The pneumatic shock absorber of claim 1, further comprising a control valve in the conduit means.

4. The pneumatic shock absorber of claim 3, wherein the control valve is adjustable for maintaining a pressure in the pressure chamber which is lower than the pressure to which the relief valve responds when the check valve permits delivery of compressed air to the pressure chamber.

5. The pneumatic shock absorber of claim 4, wherein the control valve and the relief valve are adjustable to produce an air pressure in the pressure chamber capable of cushioning shocks applied at a relatively high frequency.

6. The pneumatic shock absorber of claim 1, further comprising means on the cylinder for mounting the absorber in an assembling machine.

7. The pneumatic shock absorber of claim 6, wherein the mounting means comprises external threads on the cylinder for adjustably mounting the absorber in a tapped bore in the assembling machine.

* * * * *